United States Patent
Uusitalo

[11] Patent Number: 6,121,759
[45] Date of Patent: Sep. 19, 2000

[54] ARRANGEMENT OF SWITCHED-MODE POWER SUPPLIES CONNECTED IN PARALLEL WITHOUT A SEPARATION DIODE

[75] Inventor: Jouni Uusitalo, Vantea, Finland

[73] Assignee: Nokia Telecommunications Oy, Espoo, Finland

[21] Appl. No.: 09/180,164

[22] PCT Filed: May 29, 1997

[86] PCT No.: PCT/FI97/00328

§ 371 Date: Nov. 3, 1998

§ 102(e) Date: Nov. 3, 1998

[87] PCT Pub. No.: WO97/45947

PCT Pub. Date: Dec. 4, 1997

[30] Foreign Application Priority Data

May 30, 1996 [FI] Finland ..................................... 962271

[51] Int. Cl.[7] ...................................................... G05F 1/40
[52] U.S. Cl. ................................ 323/272; 361/90; 361/18
[58] Field of Search ...................................... 323/272, 268; 361/90, 18

[56] References Cited

U.S. PATENT DOCUMENTS

| 4,290,101 | 9/1981 | Hergenhan . | |
|---|---|---|---|
| 4,359,679 | 11/1982 | Regan | 323/272 |
| 4,371,919 | 2/1983 | Andrews et al. | 363/65 |
| 4,425,613 | 1/1984 | Shelly | 363/26 |
| 4,920,309 | 4/1990 | Szepesi | 323/269 |
| 5,122,726 | 6/1992 | Elliott et al. | 323/272 |
| 5,164,890 | 11/1992 | Nakagawa et al. | 363/65 |

FOREIGN PATENT DOCUMENTS 40 25 718  2/1992  Germany .

*Primary Examiner*—S. Riley
*Attorney, Agent, or Firm*—Altera Law Group LLC

[57] ABSTRACT

An arrangement of switched-mode power supplies is disclosed. The arrangement includes at least two switched-mode-type power supplies that are provided with a transformer and that have outputs connected in parallel without a separation diode at the output of each power supply. Each parallel-connected switched-mode power supply includes means for generating in a reference voltage output a voltage that is proportional to the pulse duty factor of the secondary voltage of the transformer. The reference voltage outputs of each switched-mode power supply are connected in parallel. Each parallel-connected switched-mode power supply also includes means for detecting a current that flows through the reference voltage output, and for generating a correction voltage proportional to this current in order to correct the output voltage of the switched-mode power supply.

6 Claims, 1 Drawing Sheet

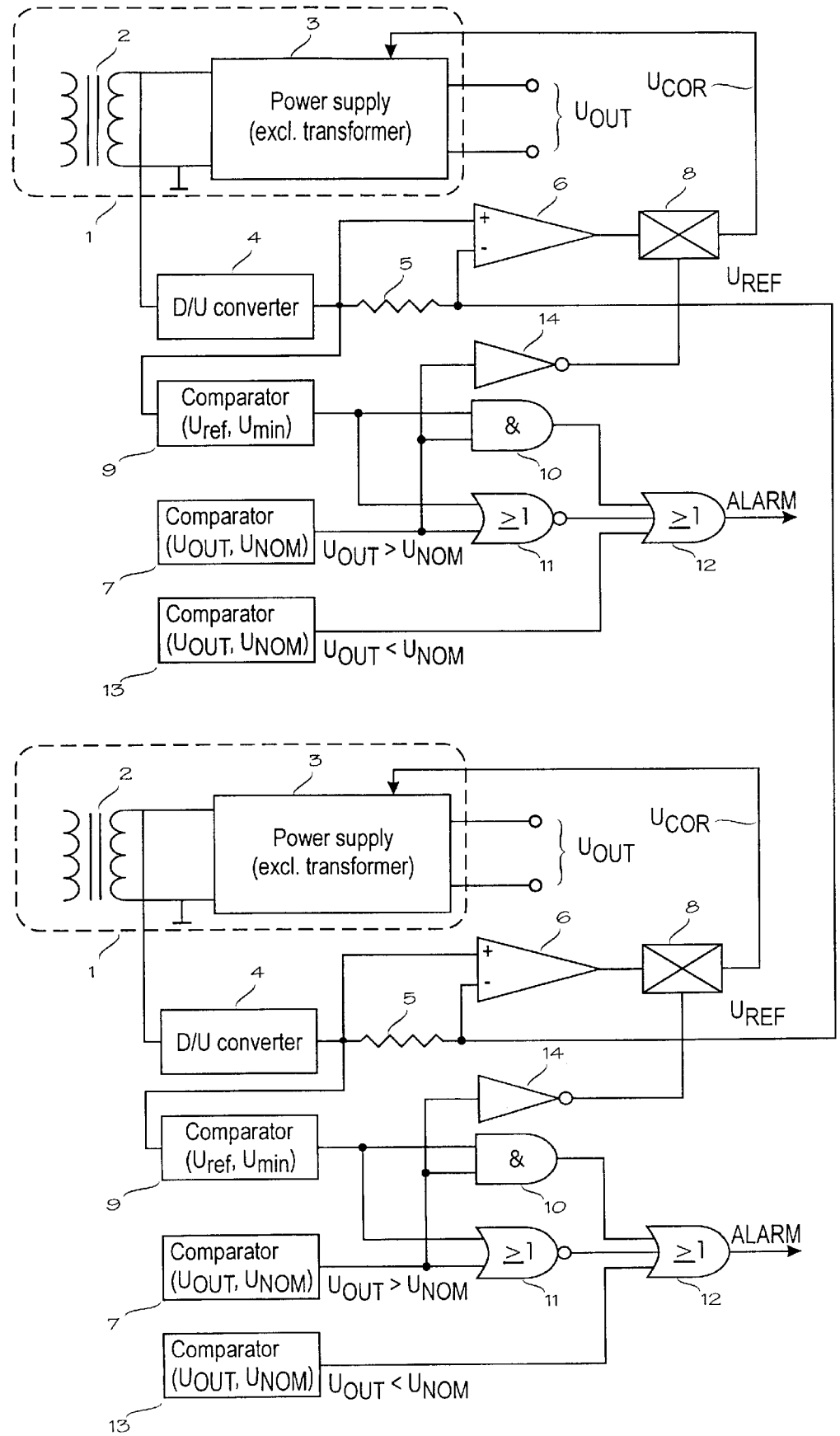

ARRANGEMENT OF SWITCHED-MODE POWER SUPPLIES CONNECTED IN PARALLEL WITHOUT A SEPARATION DIODE

BACKGROUND OF THE INVENTION

The present invention relates to a switched-mode power supply arrangement comprising at least two switched-mode-type power supplies that are provided with a transformer and that have outputs connected in parallel.

As described above, the invention relates specifically to a switched-mode power supply arrangement comprising at least two parallel-connected switched-mode-type power supplies. Supervision of output voltages of such switched-mode-type power supplies to be connected in parallel typically requires the use of a so-called separation diode. However, such a separation diode considerably decreases the efficiency of the power supply, especially in power supplies having a low output voltage (e.g. 2.1 V and 3.3 V) used more and more commonly.

The object of the present invention is to provide a switched-mode power supply arrangement where single switched-mode-type power supplies can be connected in parallel without the need for a separation diode at the output of each power supply. Another object of the invention is to provide a switched-mode power supply arrangement which enables controlling, with very simple means, the operation of each parallel-connected switched-mode power supply and giving an alarm concerning different failure modes.

SUMMARY OF THE INVENTION

The aforementioned objects are achieved by means of a switched-mode power supply arrangement according to the invention, characterized in that each parallel-connected switched-mode power supply comprises means for generating in a reference voltage output a voltage that is proportional to the pulse duty factor of the secondary voltage of the transformer, that the reference voltage outputs of each switched-mode power supply to be connected in parallel are coupled together, and that each parallel-connected switched-mode power supply also comprises means for detecting a current that flows through the reference voltage output, and for generating a correction voltage proportional to this current in order to correct the output voltage of the switched-mode power supply.

In the arrangement according to the invention, a voltage that is proportional to the pulse duty factor of each switched-mode power supply is compared to the corresponding average voltage of the other parallel-connected switched-mode power supplies, and the obtained offset voltage is used to correct the output voltage of the switched-mode power supply in such a way that even with a small load the pulse duty factor remains equal with the other switched-mode power supplies, so that all parallel-connected switched-mode power supplies remain in operation also with a small load.

Each switched-mode power supply to be connected in parallel preferably also comprises an overvoltage comparator for comparing the output voltage of the switched-mode power supply to a predetermined nominal voltage and means for disconnecting the correction voltage of the output voltage when the output voltage exceeds the nominal voltage. If the output voltage of a switched-mode power supply exceeds its normal or nominal level, the output voltage being the same for each parallel-connected switched-mode power supply due to the parallel connection, the overvoltage comparator disconnects the correction of the output voltage and simultaneously the upkeep; in other words the control circuits of the non-faulty switched-mode power supplies terminate their operation and the only power supply still in operation is the faulty one that causes the overvoltage.

It is also preferable that each switched-mode power supply to be connected in parallel also comprises a voltage comparator for comparing the reference voltage to a predetermined minimum voltage in order to detect the operation of the switched-mode power supply, and means for combining the operation data and the overvoltage data and for giving an alarm, depending on the combination of the aforementioned data. When data indicating the operation of the switched-mode power supply is provided on the basis of the reference voltage by means of the comparator and when this data is combined with the overvoltage data obtained from the overvoltage comparator, it is possible to generate overvoltage alarm data to a switched-mode power supply if there is an overvoltage and if the switched-mode power supply in question is in operation. On the other hand, if the switched-mode power supply is not in operation and if there would seem to be no overvoltage, a fault alarm is given concerning the switched-mode power supply.

It is also preferable that each switched-mode power supply to be connected in parallel also comprises an undervoltage comparator for comparing the output voltage of the switched-mode power supply to a predetermined nominal voltage and means for giving an alarm when the output voltage falls below the nominal voltage.

BRIEF DESCRIPTION OF THE DRAWING

In the following, a switched-mode power supply arrangement according to the invention will be described in greater detail with reference to the accompanying drawing, which is a functional block diagram illustrating one switched-mode power supply to be connected in parallel in the switched-mode power supply arrangement according to the invention.

DESCRIPTION OF THE PREFERRED EMBODIMENT

In the FIGURE, reference numeral 1 denotes a switched-mode power supply that is provided with a transformer 2 and that may be a forward-type switched-mode power supply, for example. The other components contained in the switched-mode power supply 1, excluding the transformer 2, are represented by a block that is denoted by reference numeral 3 and that provides an output voltage Uout. Such a switched-mode power supply of the forward-type, for example, is fully conventional in the art and therefore its operation will not be described in greater detail in this connection.

According to the invention, the pulse duty factor of the secondary voltage of the transformer 2 in the switched-mode power supply 1 is monitored by converting it with a D/U converter represented by a block 4 into a voltage Uref that is proportional to the pulse duty factor. The pulse duty factor of the switched-mode power supply refers to the ratio between the pulse width and the period. The pulse duty factor is therefore always between 0 and 1, since it describes the proportion of the pulse width from the total duration of the period. It is this pulse duty factor that is used to adjust the output voltage of the switched-mode power supply, and this average output voltage is naturally the higher the greater the pulse duty factor, i.e. the longer the proportion the pulse width covers from the total duration of the period.

The voltage Uref that is generated with the block 4 and that is proportional to the pulse duty factor is significant in the arrangement according to the invention. By coupling the reference voltages of the parallel-connected switched-mode power supplies directly to each other, it is possible to easily generate a control voltage for each switched-mode power supply, so that their output voltages Uout can be adjusted to the same level. If there is a current flow through the output Uref, it means that the parallel-connected switched-mode power supplies have had different pulse duty factors and therefore the voltages Uref proportional to these pulse duty factors have been mutually different. By monitoring this current by means of an amplifier 6 for example over a resistor 5 that is connected in series with the reference voltage output of the block 4, it is possible to generate a correction voltage Ucor that is proportional to this current. In the coupling shown in the drawing, this voltage Ucor is connected to the block 3 where it is used to adjust the level of the output voltage Uout of the switched-mode power supply such that the current flow through the resistor 5 can be made as small as possible.

The switched-mode power supply arrangement according to the invention can be supplemented further in a simple manner by utilizing the voltage Uref that is proportional to the pulse duty factor. If this reference voltage Uref is very low or zero, it means that the pulse duty factor is very low and the switched-mode power supply is therefore not in operation. This comparison is performed with a comparator 9 where the voltage Uref is compared to a low predetermined voltage level that can be called for example a minimum voltage. When the voltage falls below this minimum voltage, the switched-mode power supply is considered to have stopped operating and this data is forwarded to blocks 10 and 11 where it is combined with the overvoltage data from a comparator 7. This comparator 7 is arranged to compare the output voltage Uout of the switched-mode power supply to a predetermined nominal voltage Unom. If the comparator 7 detects that the output voltage of the switched-mode power supply exceeds the nominal value Unom, this output data of the comparator 7 (e.g. value 1) is used to control an inverting amplifier 14 the output of which (e.g. value 0) in turn controls an analog switch 8 that disconnects the supply of the correction voltage Ucor to the switched-mode power supply 1. Since the overvoltage comparator 7 has disconnected, by means of the switch 8, the correction of the output voltage from the switched-mode power supply and simultaneously the upkeep, it means that the control circuit of each parallel and operating switched-mode power supply terminates, as a result, the operation of the power supply and the only switched-mode power supply in operation is the faulty one that causes the overvoltage.

Since the comparator 9 provides data about the operation of the switched-mode power supply and, on the other hand, since the comparator 7 provides data about the overvoltage mode, it is possible to give an overvoltage alarm concerning the switched-mode power supply in question by combining the aforementioned data in the block 10 which is a logic AND circuit. On the other hand, if the comparator 9 provides data that the switched-mode power supply is not in operation, but on the other hand, there is no overvoltage data from the comparator 7, this data of the logic level 0 can be combined in the block 11 which is a logic NOR circuit, and it is possible to provide data indicating that the switched-mode power supply in question is faulty.

The switched-mode power supply arrangement according to the invention further comprises an undervoltage comparator 13 where the output voltage Uout of the power supply is compared to the aforementioned predetermined nominal voltage Unom. If such an undervoltage state is detected, a direct alarm is given via a block 12, By means of the blocks 7 and 9 to 13 it is possible to generate different alarm data in different modes of operation, as described above. The aforementioned different alarm modes and their operating conditions are also shown in the following table.

|  | Uout < Unom | Uout = Unom | Uout > Unom |
|---|---|---|---|
| power supply in operation | ALARM | IN ORDER | ALARM |
| power supply stopped | ALARM | ALARM | IN ORDER |

As described above, it is possible to eliminate, with relatively simple arrangements, the separation diode that was previously required at the output of parallel-connected switched-mode-type power supplies and that decreased their efficiency. Further, with the arrangement according to the invention the output voltages of the switched-mode power supplies to be connected in parallel can be adjusted in such a way that all the power supplies remain in operation also without a load. In this manner, the operation of the power supplies can also be monitored in case of a very small or zero load.

The switched-mode power supply arrangement according to the invention and the advantages it provides are described above by means of only one illustrative embodiment and it should be understood that it can be modified in some ways, especially as regards the detailed structure of the means providing the different functions, without deviating from the scope of protection defined in the appended claims, however.

I claim:

1. An arrangement of switched-mode power supplies comprising at least two switched-mode-type power supplies (1) that are provided with a transformer (2) and that have outputs (Uout) connected in parallel without a separation diode at the output of each power supply, each parallel-connected switched-mode power supply (1) further comprising means (4) for generating in a reference voltage output (Uref) a voltage that is proportional to the pulse duty factor of the secondary voltage of the transformer (2), the reference voltage outputs (Uref) of each switched-mode power supply (1) to be connected in parallel are coupled directly to each other, and each parallel-connected switched-mode power supply (1) also comprises means (5, 6) for detecting a current that flows through the reference voltage output (Uref), and for generating a correction voltage (Ucor) proportional to this current in order to correct the output voltage (Uout) of the switched-mode power supply.

2. A switched-mode power supply arrangement according to claim 1, characterized in that each switched-mode power supply (1) to be connected in parallel also comprises an overvoltage comparator (7) for comparing the output voltage (Uout) of the switched-mode power supply to a predetermined nominal voltage (Unom), and means (8) for disconnecting the correction voltage (Ucor) of the output voltage when the output voltage (Uout) exceeds the nominal voltage (Unom).

3. A switched-mode power supply arrangement according to claim 2, characterized in that each switched-mode power supply (1) to be connected in parallel also comprises a voltage comparator (9) for comparing the reference voltage (Uref) to a predetermined minimum voltage (Umin) in order to detect the operation of the switched-mode power supply (1), and means (10, 11, 12) for combining operation data and overvoltage data and for giving an alarm depending on the combination of the aforementioned data.

4. A switched-mode power supply arrangement according to claim 1, characterized in that each switched-mode power supply (1) to be connected in parallel also comprises an undervoltage comparator (13) for comparing the output voltage (Uout) of the switched-mode power supply to a predetermined nominal voltage (Unom) and means (12) for giving an alarm when the output voltage falls below the nominal voltage.

5. A switched-mode power supply arrangement according to claim 2, characterized in that each switched-mode power supply (1) to be connected in parallel also comprises an undervoltage comparator (13) for comparing the output voltage (Uout) of the switched-mode power supply to a predetermined nominal voltage (Unom) and means (12) for giving an alarm when the output voltage falls below the nominal voltage.

6. A switched-mode power supply arrangement according to claim 3, characterized in that each switched-mode power supply (1) to be connected in parallel also comprises an undervoltage comparator (13) for comparing the output voltage (Uout) of the switched-mode power supply to a predetermined nominal voltage (Unom) and means (12) for giving an alarm when the output voltage falls below the nominal voltage.

* * * * *

UNITED STATES PATENT AND TRADEMARK OFFICE
CERTIFICATE OF CORRECTION

PATENT NO. : 6,121,759
DATED : September 19, 2000
INVENTOR(S) : Uusitalo

It is certified that error appears in the above-identified patent and that said Letters Patent is hereby corrected as shown below:

Title page,
Item [75] Inventors, please replace "Vantea" with -- Vantaa --.

Signed and Sealed this

Fifth Day of March, 2002

*Attest:*

JAMES E. ROGAN
*Director of the United States Patent and Trademark Office*

*Attesting Officer*